No. 648,569. Patented May 1, 1900.
J. A. McCARTHY.
INCANDESCENT VAPOR BURNER.
(Application filed May 22, 1899.)
(No Model.)
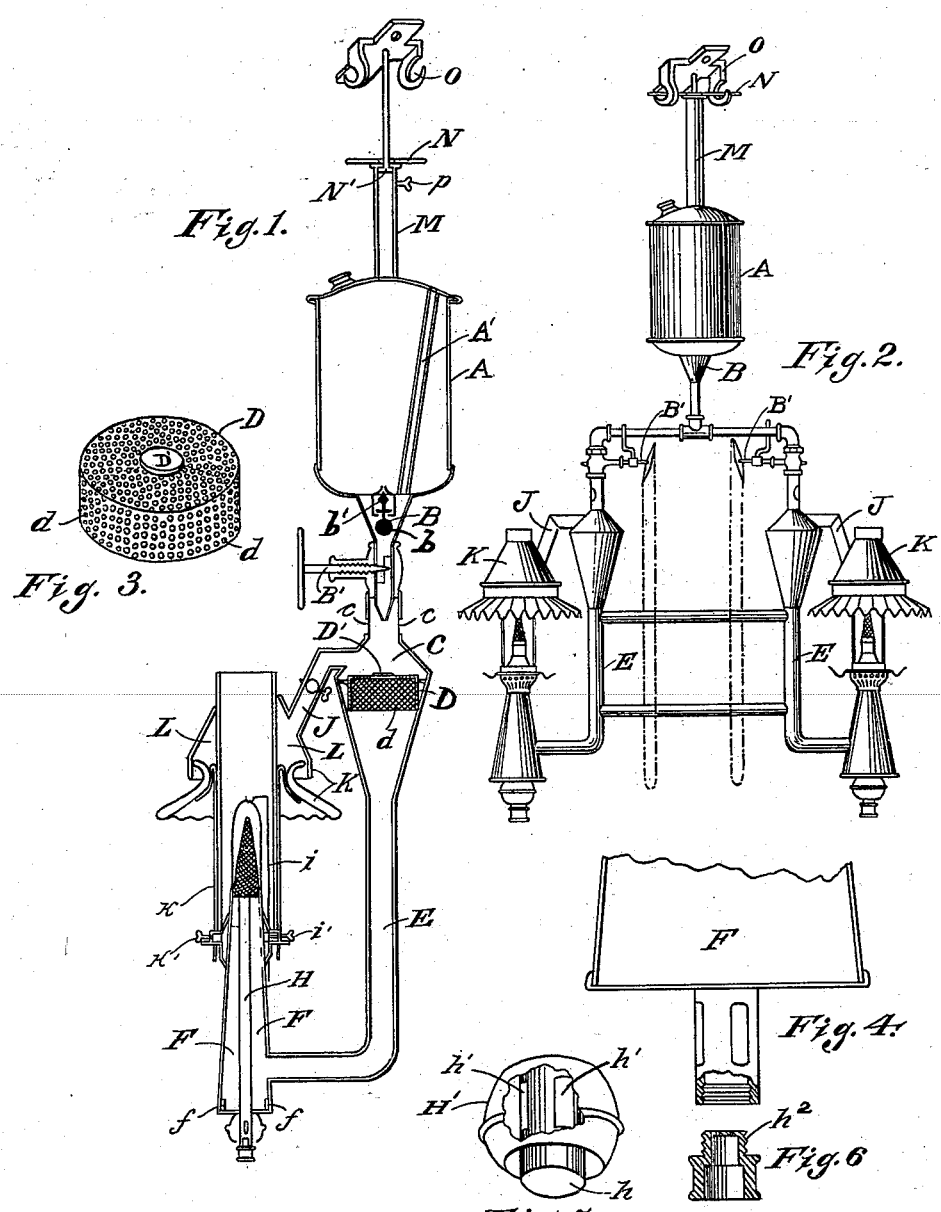
Witnesses:
H. H. Eldredge
Emma Heckel
Inventor:
John A. McCarthy
per Eugene Ayres,
Attorney.

UNITED STATES PATENT OFFICE.

JOHN A. McCARTHY, OF ST. JOSEPH, MISSOURI.

INCANDESCENT VAPOR-BURNER.

SPECIFICATION forming part of Letters Patent No. 648,569, dated May 1, 1900.

Application filed May 22, 1899. Serial No. 717,748. (No model.)

*To all whom it may concern:*

Be it known that I, JOHN A. MCCARTHY, a citizen of the United States, residing at St. Joseph, in the county of Buchanan and State of Missouri, have invented certain new and useful Improvements in Self-Vaporizing and Gas-Generating Illuminating Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in self-vaporizing lamps in which the liquid hydrocarbons are sufficiently generated into gas as they pass from the reservoir to the ignition-tube to ignite without the aid of a separate heating device, the heat from the flame after lighting completing the vaporization and generation and securing a brilliant light.

I attain my object by the mechanism illustrated in the accompanying drawings, in which—

Figure 1 is a vertical section of a single lamp embodying my invention. Fig. 2 is a front elevation of a double lamp embodying the invention. Fig. 3 is a perspective of a perforated vaporizer. Fig. 4 is a section of the base of the gas-chamber and lower end of the cold-air tube. Fig. 5 is a perspective of the air-regulator, and Fig. 6 is a section of a cap at the bottom of the regulator.

Similar letters refer to similar parts throughout the several views.

My device consists of a tank A, with a float and valve space B and its float $b$ and valve $b'$, at the bottom of which valve-space there is a needle-point valve B'. An air-tube A' extends through the tank to allow the float to rise and fall, thereby causing a steady flow of the liquid and an equal pressure. The valve-outlet space opens into a mixing-chamber C, in which there is a vaporizer D, Fig. 3. This vaporizer is attached to the inside of the mixing-chamber. It is bottomless, and its top and side have minute perforations $d\ d$, except at the center of the top, which is provided with a solid raised plate D'. Just below the needle-point valve and outlet small glass or mica loopholes or windows $c\ c$ permit a view of the liquid drops as they descend into the mixing-chamber, thus affording means to determine their rapidity that it may be properly regulated. From the bottom of the mixing-chamber a conducting-pipe E extends and opens into a gas-chamber F. Extending vertically through the center of this gas-chamber is a cold-air supply-tube H, with its base at or below the bottom of the gas-chamber and its top at the base of the lamp-burner. This cold-air tube is provided with a revoluble regulator H', Fig. 5. A section of tube $h$ is fastened rigidly in the regulator at its top. There is a circular space between the regulator and section of tube $h$ from top to open bottom for admission of cold air, and tube $h$ is provided with openings $h'\ h'$ in the side, corresponding with apertures in the side of cold-air tube H near its bottom. This section of tube $h$ fits closely around cold-air tube H, and the amount of cold air admitted into said cold-air tube is thus easily regulated by a partial revolution of the regulator. A removable cap $h^2$, Fig. 6, is adapted to form the base of said cold-air supply-tube H and the section of tube $h$.

My lamp is adapted to the use of the Welsbach or similar types of burners and is provided with a mantle carried and raised and lowered by a wire $i$, said wire being held in position desired by the use of a thumb-screw $i'$. The burner being made of perforated material of right-cone shape, an equal flame for the entire surface of the mantle is produced. The base of gas-chamber F is provided with asbestos packing $ff$ for the purpose of absorbing any of the liquid hydrocarbons which by any possibility may escape vaporization.

A hot-air pipe or conduit J, with a check-damper or valve having its upper end connected with the mixing-chamber C, has a roof K, of metal or any suitable material, rigidly attached to its lower end, which roof at its apex closely encircles the lamp-chimney. An ordinary lamp-shade is carried by uprights $k\ k$ and by them is held fitted up close into the lower part of roof K and is also lowered or raised by them, they being engaged by thumb-screws $k'\ k'$. In the mechanism described it will be seen that a triangular space is left between the outside of the lamp-chimney, the inside of metal roof K, and the top of the ordinary lamp-shade. This space encircling the chimney constitutes a hot-air chamber L, it being heated by the heat emitted through the chimney. This hot-air rises into mixing-chamber C through hot-air pipe J, its only way of escape. An adjustable shaft M is rigidly fastened on the top of the tank for the purpose of supporting my device from the ceiling and raising or lowering it. This shaft consists of inner and outer sections and a shoulder M' to serve as a stop when lowering the lamp. Two prongs N N are rigidly attached by riveting or otherwise to the top of the outer shaft. On the top of the inner shaft there is a right-and-left hook-socket O, adapted to be attached to the ceiling and into which prongs N N are locked by raising the lamp and outer section of shaft until said prongs are carried between the hooks and by then making a half-turn of the lamp and outer section of shaft, thus carrying said prongs into position to drop into the hook-socket. A thumb-screw $p$, inserted in the side of the outer section of shaft near its top and operating against the inner section of shaft, allows the lamp to be adjusted at any height desired.

The tank having been supplied with liquid hydrocarbons and the lamp adjusted to a convenient height, it is only necessary to open valve B' sufficiently to allow the liquid in the tank to pass out in drops. These drops passing separately through mixing-chamber C and striking upon the solid center plate D' of vaporizer with considerable force are each broken into minute particles and sprayed over the vaporizer and being thereby exposed are vaporized into gas, which by the circulating air is drawn through conducting-pipe E into gas-chamber F. Within a period of about thirty seconds there is sufficient self-vaporized gas accumulated in the device to light the lamp. From this flame the air in hot-air chamber L is at once heated and the dropping liquid as it drops is thoroughly vaporized by the hot-air circulation and a brilliant light produced.

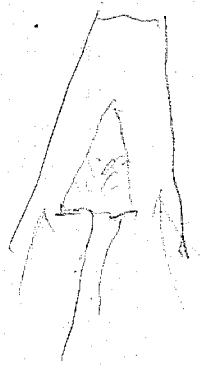

What I claim, and desire to secure by Letters Patent, is—

1. In a self-vaporizing and gas-generating illuminating device, in a combination, a mixing-chamber and a vaporizer therein, a hot-air chamber in approximately the same horizontal plane with said mixing-chamber and vaporizer consisting of the space surrounding the chimney and within the metal roof, and the hot-air pipe making connection across from said hot-air chamber to said mixing-chamber, substantially as described.

2. In a self-vaporizing and gas-generating illuminating device, the combination of a right-and-left hook-socket adapted to form rigid connection with a ceiling, a shaft consisting of the outer section rigidly attached at the bottom to the top of the tank and the inner extension section or rod with its upper end rigidly attached to the hook-socket, two prongs extending horizontally in opposite directions with inner ends fastened at the rim on the top of the lower section of the shaft and adapted by a half-turn of the lamp to lock in the hook-socket when the tank and lamp are elevated, the thumb-screw to enable the lamp to be supported at any intermediate height and the shoulder to serve as a stop when the lamp is lowered, substantially as set forth and described.

3. In an illuminating device, the combination, with a right-and-left hook-socket, of a shaft consisting of an outer adjustable section and an inner stationary section with its upper end fastened to the hook-socket, horizontally-extended duplicate prongs having their inner ends rigidly fastened to the top of the lower section of the shaft and adapted, when elevated, to lock into the hook-socket, a thumb-screw to hold the device at any intermediate height, and a shoulder to serve as a stop when the outer section of the shaft is lowered, substantially as described.

4. In an illuminating device, the combination of a shaft consisting of a rigidly-attached inner section and an adjustable outer section, a shoulder serving as a stop, a right-and-left hook-socket adapted to be permanently attached to the ceiling and two prongs with inner ends rigidly attached to the top of the outer section of the shaft adapted by a half-turn of the lamp to lock in the hook-socket, substantially as described and for the purpose specified.

5. In a self-vaporizing and gas-generating and illuminating device, the combination with a Welsbach or similar burner, of an ordinary lamp-chimney and an ordinary lamp-shade upon said chimney the top of which serves as a base for a chamber for heated air, a metal roof the apex of which is fitted closely around the chimney near its top and the eaves of which rest upon the top of the lamp-shade, the triangular hot-air chamber formed thereby and a pipe provided with a check-damper opening at one end to receive and transmit the hot air from said chamber across to the mixing-chamber and vaporizer, substantially as set forth.

6. In an illuminating device, in a combination, a mixing-chamber and a vaporizer therein, a hot-air chamber receiving its heat from the burner through the chimney, the hot-air and mixing chambers being in approximately the same horizontal plane and in close proximity, substantially as described.

7. In a self-vaporizing and gas-generating and illuminating device, the combination of a vertical gas-chamber, a cold-air tube through the center of the same its top opening into the base of the burner to allow the cold air to come in contact with the hot surface of the burner and, the air being expanded, secure a greater illuminating power, a regulator at the bottom of said tube below the base of the gas-chamber by which to increase the supply of cold air, consume the vapor more rapidly and revive the mantle when darkened by the flame, a burner of perforated material of right-cone shape to secure an equal flame for the entire surface of a mantle, the mantle and the wire for carrying the same and the thumbscrew for holding it in position, the chimney and the hot-air chamber around the chimney from which chamber the heat is transmitted through the hot-air pipe to the vaporizer, substantially as described and for the purpose specified.

8. In a self-vaporizing and gas-generating and illuminating device, the combination with a vaporizer of a vertical gas-chamber, a cold-air tube through the center of the same with its base below the gas-chamber and its top opening into the base of the burner to permit the cold air to come in contact with the heated surface of the burner thus securing greater illuminating power, a regulator on the base of said tube by which to increase the supply of cold air thereby checking the flame caused by the liquids not being thoroughly vaporized and reviving the mantle when darkened by said flame, a mantle and a burner of right-cone shape to secure an equal flame for the entire surface of the mantle, a chimney and a metal roof and a shade and the hot-air chamber inclosed between said chimney, roof and shade, substantially as described and for the purpose specified.

9. In a self-vaporizing and gas-generating and illuminating device, the combination with a tank for hydrocarbons, of a mixing-chamber C having means of communication with said tank, and a perforated vaporizer D therein and a conducting-pipe E, all vertically beneath said tank, said conducting-pipe being bent at a right angle at its base, the vertically-constructed gas-chamber F into which said conducting-pipe empties, the cold-air-supply tube H extending through the center of said gas-chamber and having its base provided with a regulator, a burner of right-cone shape, a mantle, an ordinary lamp-shade and the roof K forming a hot-air chamber L, and a hot-air pipe J for transmitting the heat from said hot-air chamber to the mixing-chamber, substantially as described.

10. In a self-vaporizing and gas-generating and illuminating device the combination with a tank, of the mixing-chamber C, the perforated vaporizer therein, the conducting-pipe E extended vertically down, the vertical gas-chamber F, said conducting-pipe being turned horizontally to connect therewith near its base, the cold-air-supply tube H through the center of said gas-chamber provided with a regulator at its base and a right-cone-shaped burner and mantle at its top, a chimney with an ordinary shade fitted thereon and the roof K, the hot-air chamber formed by said chimney, shade and roof, the hot-air pipe J for transmitting heat from the hot-air chamber to the mixing-chamber and the hook-socket O, adjustable shaft M, and prongs N N by which to suspend and regulate the height of said tank and lamp, substantially as described and for the purpose specified.

In testimony whereof I affix my signature in presence of two witnesses.

JOHN A. McCARTHY.

Witnesses:
H. C. COURTER,
EMMA HECKEL.